May 12, 1964 J. B. GODSHALK 3,132,664
AUTOMATIC VALVES AND POULTRY WATERERS EMBODYING THE SAME
Filed Oct. 1, 1962 2 Sheets-Sheet 2

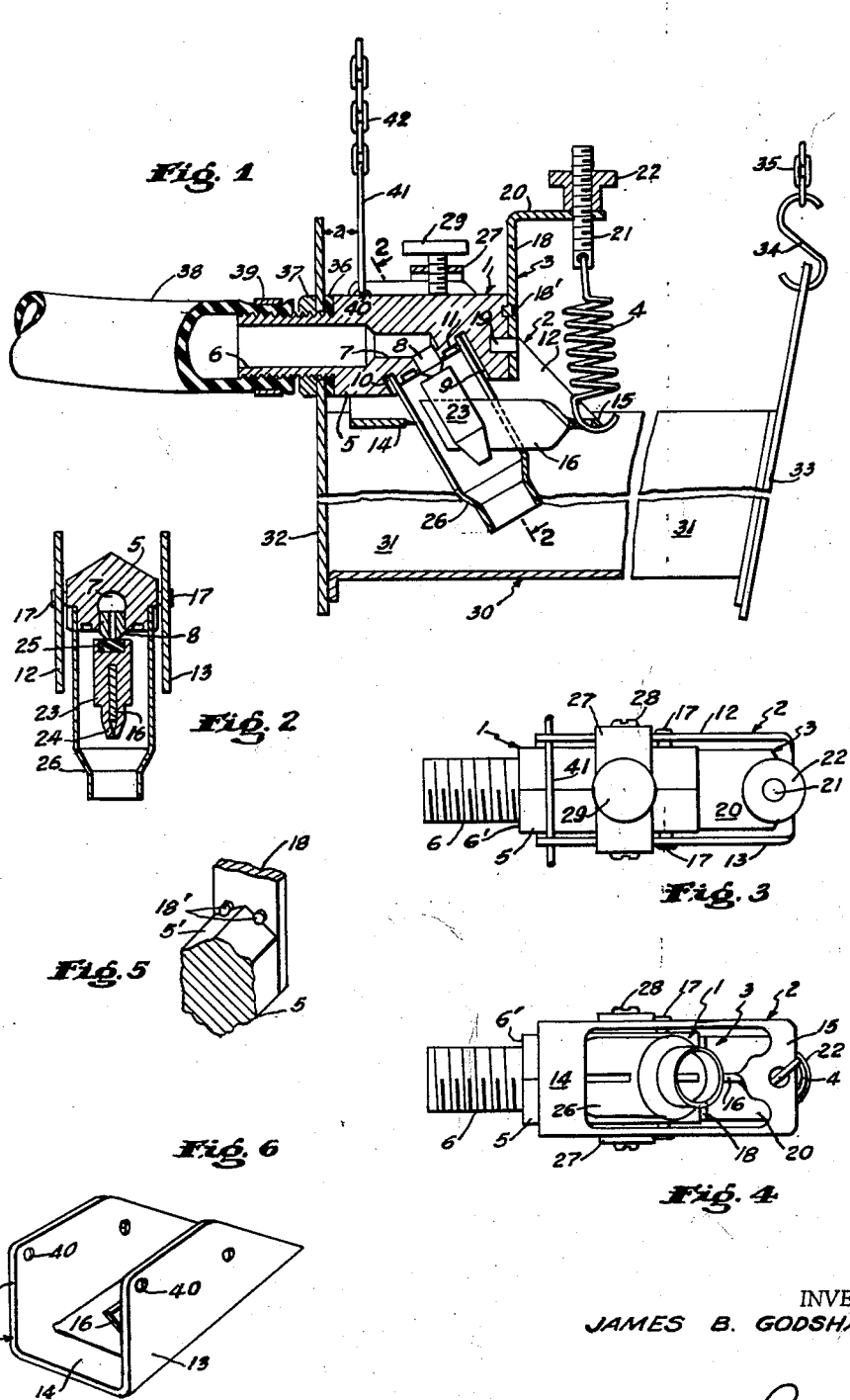

INVENTOR
JAMES B. GODSHALK

BY *Arnold & Roylance*
ATTORNEYS

United States Patent Office 3,132,664
Patented May 12, 1964

3,132,664
AUTOMATIC VALVES AND POULTRY WATERERS
EMBODYING THE SAME
James B. Godshalk, Chester Spring, Pa., assignor to Fox Products Company, Philadelphia, Pa., a corporation of Pennsylvania
Filed Oct. 1, 1962, Ser. No. 227,310
12 Claims. (Cl. 137—408)

This invention relates to automatic weight-operated valves and to poultry waterers embodying the same.

It has long been the practice in the poultry raising industry to employ automatic watering devices comprising a water receptacle, such as an elongated trough, which is pivoted at one point and suspended from the operating member of a weight-responsive valve, the point of suspension being spaced considerably from the point of pivotal mounting of the trough so that the combined weight of the trough and water therein is effective to operate the valve. As originally designed, such waterers employed valves rigidly supported by structure separate from and in addition to the trough. Such early arrangements are shown, for example, in Reissue Patent 23,447, issued 25, 1951, to V. H. Pruitt. In more recent times, the waterers have been improved and simplified by mounting the valve directly on the water receptacle and suspending the receptacle via the operating member of the valve. Such an arrangement is described and claimed in U.S. Patent 3,034,481, issued to me on May 15, 1962. While the type of waterer disclosed in my Patent 3,034,481 has proved to be distinctly advantageous, there has been a continuing demand in the trade for simplification and cost-reduction in devices of this type.

A general object of the invention is to provide a highly simplified, low-cost, weight-operated valve which is so constructed that it can be mounted directly on a portion of the trough or other water receptacle without the use of special brackets or the like.

Another object is to devise an improved poultry waterer embodying an automatic weight-operated valve secured directly to a wall portion of the water receptacle in such fashion that the valve, instead of being located above the receptacle, is situated substantially within the receptacle.

A further object is to devise such a waterer wherein the valve is mounted directly on a relatively thin wall of the water receptacle and the receptacle is suspended via the valve, the arrangement being such that bending or flexing of the relatively thin wall of the receptacle is substantially eliminated.

Yet another object is to devise a poultry waterer of the type employing an elongated trough and embodying a weight-operated valve secured to an end wall of the trough in such fashion that the water supply conduit can be led directly to the end wall of the trough and need not be arranged above the trough.

A still further object is to devise an improved weight-operated valve capable of being mounted directly on the wall of a water receptacle without requiring any special modification of the receptacle other than the provision of an opening through which a portion of the valve can extend.

Another object is to provide an automatic weight-operated poultry watering valve which can be constructed at lower cost than was true of prior-art devices but which is characterized by long life and dependability in operation.

In order that the manner in which these and other objects are attained in accordance with the invention can be understood in detail, reference is had to the accompanying drawings, which form a part of this specification, and wherein:

FIG. 1 is a vertical longitudinal sectional view of a valve constructed in accordance with one embodiment of the invention and mounted on a poultry watering trough in accordance with the invention;

FIG. 2 is a transverse sectional view taken on line 2—2, FIG. 1;

FIG. 3 is a top plan view of the valve of FIG. 1;

FIG. 4 is a bottom plan view of the valve of FIG. 1;

FIG. 5 is a fragmentary perspective view illustrating the manner in which the spring-retaining bracket of the valve of FIG. 1 is mounted on the valve body;

FIG. 6 is a perspective view of the operating lever of the valve of FIG. 1;

Figure 7:
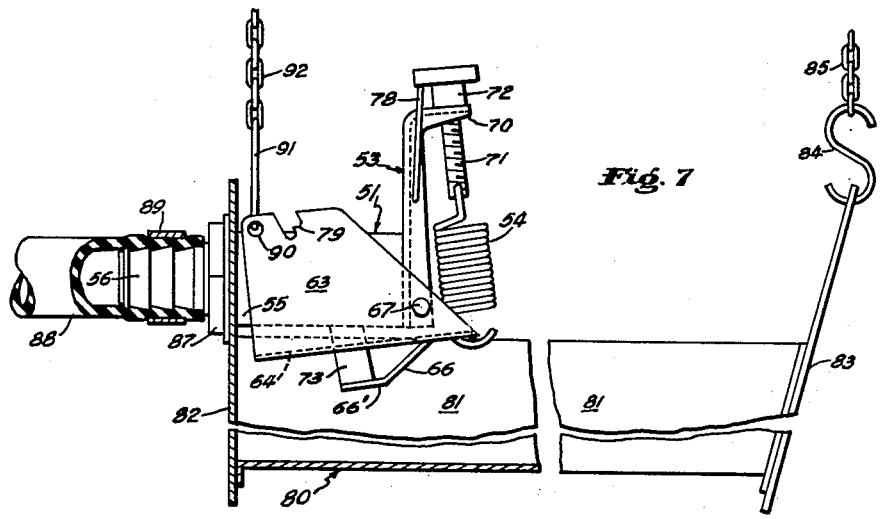
FIG. 7 is a side elevational view, with some parts broken away for clarity of illustration, of a valve constructed and mounted in accordance with another embodiment of the invention.

Turning now to the drawings in detail, and first to FIGS. 1-6 thereof, it will be seen that the embodiment of the invention here illustrated comprises an elongated valve body indicated generally at 1, a pivoted operating lever 2, a spring-retaining bracket 3 fixed to the valve body, and a helical tension spring 4 connected between the bracket 3 and the lever 2. Body 1 is formed integrally from a single piece of brass or the like and comprises a main portion 5 of hexagonal transverse cross section and an exteriorly threaded tubular portion 6 projecting axially from the main body portion 5. To provide a water supply chamber, body portion 5 is formed with a central, axially extending bore 7 which communicates with tubular portion 6 and terminates at a point intermediate the ends of the main body portion 5. A lateral bore is also provided in portion 5, communicating with bore 7 and slanting outwardly away from projection 6. This lateral bore accommodates a fixed valve member or insert 8 which, as seen in FIG. 2, has a tapered outer tip and a relatively small central bore which leads from bore 7.

Main body portion 5 also has a cylindrical, outwardly opening recess 9 which is coaxial with insert 8 and substantially larger in diameter than is the insert. Inwardly of body portion 5, the recess 9 terminates in a transverse end wall formed with an outer annular groove 10 and an inner annular groove 11 which closely surrounds the insert 8.

Operating lever 2 is of U-shaped transverse cross section and comprises a pair of identical side flanges 12 and 13 which are interconnected by spaced bottom webs 14 and 15, FIGS. 1 and 4. Formed integrally with web 15, and joining that web at the center thereof, is a flat arm 16 which is twisted through 90° so as to extend midway between and parallel to the two side flanges 12 and 13. Arm 16 projects toward web 14 but terminates short thereof, the free tip of arm 16 being cut at an angle so as to lie parallel to the axis of insert 8 when the operating lever is so disposed that the common plane occupied by webs 14 and 15 is parallel to the longitudinal axis of the valve body.

Lever 2 can be formed, as by stamping, from a single sheet of brass or other suitable metal, and is of such size that its side flanges 12 and 13 are spaced from each other by a distance adequate to freely accommodate main body portion 5. The side flanges 12 and 13 are each provided with a circular opening, the two openings being aligned transversely of the operating lever. Main body portion 5 provided with a pair of transversely aligned, outwardly opening, cylindrical recesses. A rivet, as indicated at 17, is fixed in the opening in each of side flanges 12 and 13 and projects inwardly into the corresponding one of the transversely aligned recesses in body portion 5, so that the two rivets pivotally mount the operating lever on the valve body in such fashion that the axis of pivotal movement for the operating lever extends transversely through the the valve body adjacent the end thereof which is opposite projection 6.

Bracket 3 is L-shaped. The end of body portion 5 which is opposite projection 6 is flat and extends at right angles to the longitudinal axis of the valve body. One leg 18 of bracket 3 extends across this end of the valve body and is fixed thereto, as by a staked pin 19 which extends into a suitable recess in the valve body. To prevent rotation of the bracket about pin 19, leg 18 is provided with a transversely spaced pair of half punches 18' each of which engages a different side surface 5', FIG. 5, of main portion 5 of the valve body. Leg 18 of bracket 3 projects laterally away from the valve body and, at its end, joins a shorter leg 20 which extends parallel to the longitudinal axis of the valve body. Leg 20 is provided with a circular aperture near its tip and a threaded member 21 extends therethrough, cooperating with a nut 22 which engages the face of leg 20 which is directed away from the valve body.

At its center web 15 is provided with an opening. Spring 4 has a hook at each end, one end of the spring being engaged through the opening in web 15 and the other end of the spring being engaged through a suitable transverse aperture in the corresponding end of member 21. Accordingly, spring 4 biases lever 2, about the pivotal axis established by rivets 17, in a direction to move arm 16 away from the valve body. It will be understood that adjustment of nut 22 on threaded member 21 serves to vary the tension applied to the biasing spring.

Near its free tip, arm 16 carries the movable valve member 23. Member 23 is generally cylindrical and provided with a central slot through which arm 16 extends, the free ends of the two portions of member 23 which are provided by the slot being crimped together, as indicated at 24 in FIG. 2, to clamp member 23 rigidly on arm 16. At its end directed toward insert 8, member 23 is provided with a cylindrical recess which accommodates a gasket 25 of a material suitable for forming a fluid-tight seal with the exposed tip of insert 8 when arm 16 is pivoted to bring the gasket against the insert. Member 23 extends at an angle to the longitudinal axis of arm 16, this angle being such that, as gasket 25 is swung into engagement with the free tip of insert 8, the exposed face of the gasket will be brought into a position at right angles to the axis of the insert.

A tubular anti-splash nozzle 26 is provided, the nozzle being generally cylindrical and having axially extending slots 26' either of which can accommodate arm 16, depending upon the position in which the nozzle is installed. One end of the nozzle embraces the annular shoulder provided by groove 10, at the inner end of the cylindrical recess 9.

A yoke 27, having the configuration of a shallow U, extends between the free longitudinal edges of side flanges 12 and 13 of the operating lever, the short legs of the yoke extending along the outer faces of the upper portions of side flanges 12 and 13 and being secured thereto, as by screws 28. The main body of yoke 27 is provided with a threaded, centrally located aperture in which is engaged a thumb screw 29, the screw extending toward the main portion 5 of the valve body. Since the combination of yoke 27 and thumb screw 29 is located on the side of the valve body opposite arm 16 and movable valve member 23, adjustment of the thumb screw in a direction which causes the tip thereof to engage the valve body and move yoke 27 away from the valve body will serve to force gasket 25 into sealing engagement with insert 8 and thereby lock the valve in closed position.

The valve is mounted directly on a conventional watering trough indicated generally at 30. Trough 30 comprises elongated side walls 31 arranged to define a V, one end of the trough being closed by wall 32 and the other by wall 33. End wall 33 projects above the upper edges of side walls 31 and is provided with a centrally disposed aperture through which is engaged the hook 34 of a suspending chain 35. End wall 32 is provided with a circular aperture to accommodate projection 6 of the valve body.

The exteriorly threaded projection 6 joins the main portion 5 of the valve body in a transverse annular shoulder 6', and an annular sealing gasket 36 is disposed in engagement with this shoulder. A mounting nut 37 is operatively engaged with the threads on projection 6 so that end wall 32 is rigidly clamped between nut 37, on the one hand, and gasket 36 and shoulder 6', on the other. Portion 6 projects well beyond mounting nut 37 and is inserted in the end of a water supply hose 38, the hose being secured in fluid-tight relation by a clamp 39 of any conventional type.

Rivets 17 serve to pivotally connect the side flanges 12 and 13 of the operating lever to the main portion of valve body 1 adjacent the end thereof which is spaced from end wall 32 of the trough, the side flanges of the operating lever extending from this pivotal connection toward the end wall 32 and terminating close thereto. At their ends adjacent end wall 32, the upper portions of side flanges 12 and 13 are provided with apertures 40, FIGS. 1 and 6, in which are engaged the lower ends of the legs of a suitable bail 41. A second suspending chain 42 has its lower end engaged with bail 41, so that the end of the trough 30 to which the valve is attached is suspended from chain 42 via the operating lever 2 of the valve. Since bail 41 is connected to the operating lever at a point between end wall 32 and the pivotal connection between lever 2 and the valve body, it will be apparent that the combined weight of the trough, the valve and the water contained in the trough opposes spring 4 and tends to swing the operating lever in a direction to close the valve.

Side flanges 12 and 13 of the operating lever project from the pivotal axis, established by rivets 17, toward the threaded tubular projections 6 and, therefore, toward the trough end wall 32 when the valve is installed as shown in FIG. 1. It will be noted that the side flanges 12 and 13 end at locations close to end wall 32 and that the openings in the side flanges through which the ends of bail 41 are engaged are located adjacent the respective ends of the side flanges. Accordingly, as indicated in FIG. 1, the bail 41 is spaced from end wall 32 only by the relatively short distance $a$. The forces applied to end wall 32 because of suspension of this end of the trough 30 via chain 42 act only through the relatively short moment arm $a$. Accordingly, these forces, which tend to distort end wall 32, are kept small so that the end wall is adequately strong even when it is made from relatively light sheet metal, and no modification or special reinforcement of the end wall 32 is required.

To place the waterer of FIG. 1 in operation, the thumb screw 29 is first backed off to free lever 2 for a normal range of travel. The trough 30 being empty, the combined weight of the trough and valve assembly is inadequate to overcome the biasing force of spring 4. Hence, the spring is effective to swing lever 2 in a counterclockwise direction, as viewed in FIG. 1, so that the valve is open. Water accordingly flows from bore 7 through insert 8 and discharges via nozzle 26 into the trough. As the trough fills with water, the weight acting downwardly on the valve body correspondingly increases and the lever 2 is accordingly gradually pivoted in a direction tending to close the valve. When the water reaches the desired level in the trough, the combined weight of the water, trough and valve assembly becomes adequate to completely close the valve, terminating the water supply. Thereafter, the valve periodically opens, in automatic fashion, whenever the level of water in the trough decreases by an amount sufficient to allow spring 4 to again open the valve. The level of water to be maintained in the trough can be adjusted by manipulating nut 22 to vary the tension on spring 4.

Turning now to the embodiment of the invention illustrated in FIGS. 7–11, it will be seen that the valve of this embodiment again comprises a body 51, an operating lever 52, a spring-retaining bracket 53 and a biasing spring 54. Body 51 is machined from stock of rectangular transverse cross section and includes a main portion 55 and a tubular projection 56 which joins the main body portion at a transverse shoulder 56'. The bore of tubular portion 56 continues within body portion 55 as an axially aligned smaller bore 57. Portion 55 is provided with a lateral bore communicating with bore 57 and accommodating the fixed valve insert 58. Insert 58 has a central aperture and is disposed to discharge fluid outwardly from body 55 through the lateral recess 59. An annular groove 60 is provided at the bottom of recess 59 to retain the antisplash nozzle 76.

Figures 8, 10:
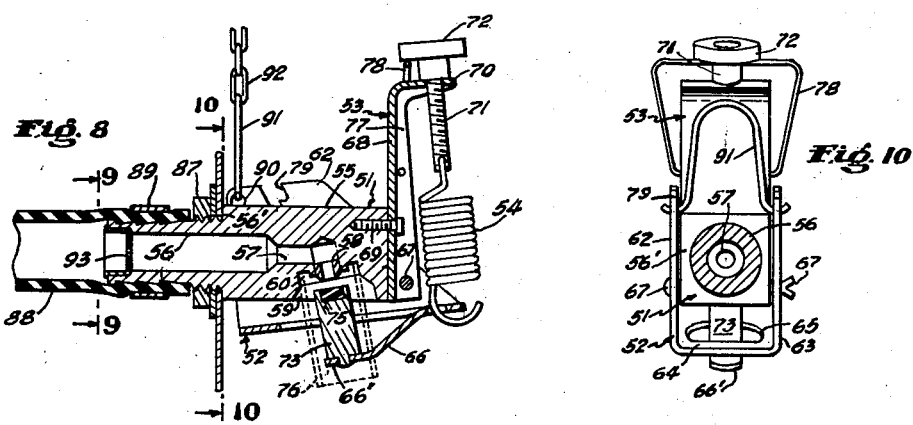
FIG. 8 is a vertical longitudinal sectional view of the valve shown in FIG. 7.
FIG. 10 is a transverse sectional view taken on line 10—10, FIG. 8.

Lever 52 is of U-shaped transverse cross section and comprises two side flanges 62 and 63 interconnected by a base web indicated generally at 64, FIG. 10. A portion of web 64 is cut away, leaving an opening as indicated at 65, FIG. 10, and the web is formed with an arm 66 which slants away from the side of web 64 opposite side flanges 62, as will be clear from FIG. 8. Lever 52 is formed from a single sheet of brass or the like and arm 66 is at least semi-resilient so as to yield to some degree during closing of the valve.

Bracket 53 is of U-shaped transverse cross section so as to have side flanges indicated at 77. The bracket is fixed rigidly to the flat end of body portion 55 in any suitable manner, as by a plurality of screws 69. Near the lower end of the bracket, side flanges 77 are provided with transversely aligned openings which accommodate a pivot pin 67 which also extends through aligned openings in the side flanges 62, 63 of lever 52. Hence, pin 67 and bracket 53 serve to mount lever 52 on the valve body for pivotal movement about an axis which is transverse to the valve body and located at the free end thereof.

Bracket 53 can be considered as having a longer leg 68 and a shorter leg 70. Shorter leg 70 is provided with an aperture accommodating a threaded member 71 which cooperates with a nut 72. At its end opposite projection 56, the web 64 of lever 52 is provided with a central aperture. Tension spring 54 has hooked ends, one being engaged in the aperture in web 64 and the other being engaged in a suitable aperture in the adjacent end of threaded member 71.

The free end portion 66' of arm 66 is bent, relative to the body of the arm, so as to extend at least generally parallel to web 64 when the valve is in open position. Portion 66' is provided with an opening in which is fixed a suitable projection on the movable valve member 73. Member 73 projects from arm 66 toward the valve body and extends into recess 59. The free tip of member 73 is provided with a cylindrical recess which retains the sealing gasket 75.

A pair of transversely aligned openings are provided in side flanges 77 in order to retain the inturned free ends of a latch bail 78. The free, longitudinally extending edges of side flanges 62 and 63 of lever 52 are provided with transversely aligned notches 79. Comparing FIGS. 7 and 11, it will be seen that the dimensions of the valve are such that the latch bail 78 can occupy either of two positions. In the first position, indicated in FIG. 7, the bail is retained beneath the head of screw 72 and thus kept in inoperative position. In the second position, seen in FIG. 11, the bail is engaged in the notches 79 in the side flanges of the operating lever. With the bail so engaged, the operating lever is held in a position such that movable valve member 73 forces gasket 75 into sealing engagement with the outer tip of fixed valve insert 58. Hence, with the parts in the positions shown in FIG. 11, the valve is latched in closed position.

Trough 80 comprises side walls 81 and end walls 82 and 83. Adjacent its upper edge, end wall 83 is provided with an opening in which the hook 84 of a first suspension chain 85 is engaged. Trough end wall 82 is provided with a circular opening through which tubular portion 56 of the valve body projects. Adjacent shoulder 56', portion 56 is exteriorly threaded and the valve body is secured to trough end wall 82 by a clamping nut 87. The remainder of tubular portion 56 is provided with annular exterior serrations and the end of a water supply hose 88 is engaged over tubular portion 56, the hose being secured in place by any conventional hose clamp 89.

Side flanges 62 and 63 of the operating lever are each provided with an opening 90, the openings 90 being located near the corners defined by the free longitudinal edges of the flanges and the transverse edges of the flanges adjacent trough end wall 82. Hence, openings 90 are immediately adjacent to end wall 82 when the valve is installed as shown. The free ends of a suspension bail 91 are engaged in openings 90 and the bail 91 is connected to a second suspension chain 92. Accordingly, the combination of the trough and valve is suspended, at the end of the trough carrying the valve, via operating lever 52 of the valve.

Figures 9, 11:
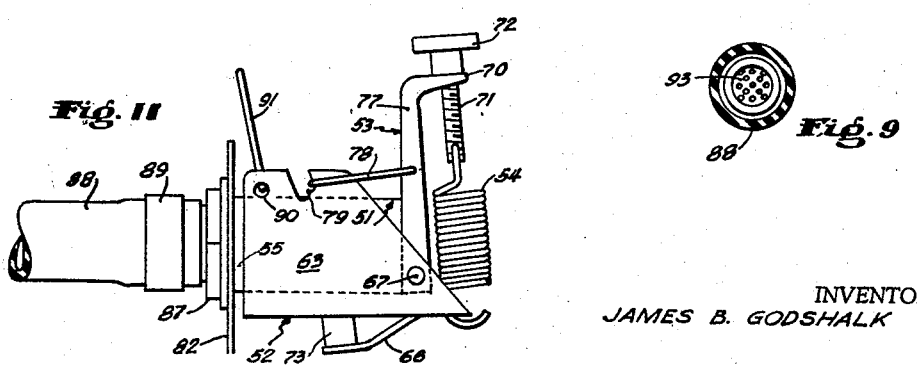
FIG. 9 is a transverse sectional view taken on line 9—9, FIG. 8.
FIG. 11 is a side elevational view of the device of FIG. 7 with the manual shut-off latch thereof in operative position.

As will be clear from FIGS. 8 and 9, a cup-shaped filter 93 is press-fitted into the tip of portion 56 of the valve body in order to strain foreign particles from the incoming water.

As seen in FIG. 10, side flanges 62 and 63 of lever 52 are parallel and spaced apart by a distance only slightly greater than the width of body portion 55. Hence, flanges 62 and 63 lie close to the flat side faces of body portion 55 and, with the upper flat face of body portion 55 being horizontal, the tendency for dirt to be funneled between the valve body and the lever is minimized.

It will be apparent that the embodiment shown in FIGS. 7–11 operates in the same general fashion as that described with reference to FIGS. 1–6.

In both embodiments, the generally U-shaped operating lever serves not only to provide a strong support for the movable valve element but also to effect stable suspension of the watering trough via the cooperating bail and suspending chain.

While particularly advantageous embodiments of the invention have been chosen for purposes of illustration, it will be understood by those skilled in the art that various changes and modifications can be made therein without departing from the scope of the invention as defined in the appended claims.

What is claimed is:

1. In a poultry waterer, the combination of
  a receptacle having an upright member of sheet material;
  a weight-operated valve comprising
    a valve body mounted on said member of sheet material and having a main body portion disposed above the bottom of said receptacle and defining a water supply chamber;
    a fixed valve element carried by said main body portion and provided with an orifice which communicates with said supply chamber and is disposed to discharge water into said receptacle;
    an operating lever pivotally mounted on said main body portion and having a portion spaced from the axis of pivotal movement of said lever and disposed adjacent said wall;
    a movable valve element actuated by said lever; and resilient means connected to said lever to bias the same in one direction;

suspension means connected to said portion of said lever, the combined weight of said receptacle and valve being supported at least in part by said suspension means via said lever, the force resulting from suspension tending to pivot said lever in the other direction, against the biasing effect of said resilient means;

said movable valve element being so positioned as to engage said fixed valve element, to close the valve, as a result of pivotal movement of said lever in said other direction; and means for supplying water to said chamber.

2. A poultry waterer in accordance with claim 1 and wherein said valve body is elongated and projects from said member of sheet material, and said lever is mounted for pivotal movement about an axis transverse to said valve body and projects from said axis toward said member of sheet material.

3. A poultry waterer in accordance with claim 2 and wherein said orifice of said fixed valve element is directed downwardly, said lever is of at least generally U-shaped transverse cross section and includes a pair of transversely spaced portions each disposed on a different side of said valve body, and said suspension means comprises a bail having its ends connected each to a different one of said transversely spaced portions of said lever.

4. A poultry waterer in accordance with claim 2 and wherein said valve further comprises a bracket secured to the end of said valve body opposite said member of sheet material, said resilient means comprising a tension spring having one end connected to said bracket and the other end connected to said lever on the side of said axis opposite said member of sheet material.

5. A poultry waterer in accordance with claim 1 and wherein said member of sheet material is provided with an opening;

said valve body includes an exteriorly threaded tubular projection extending through said opening;

the waterer further comprising a clamping nut engaged with the threads on said tubular projection to clamp said member of sheet material between said nut and said main body portion, said supply chamber communicating with the interior of said tubular projection and said means for supplying water comprising a conduit connected to said tubular projection.

6. In a poultry waterer, the combination of an elongated trough having at one end an upright transversely extending member of sheet material provided with an opening spaced above the bottom of said trough;

a weight-operated valve comprising a valve body having a main body portion, a second portion of smaller transverse dimension than said main body portion, and a bore opening through the tip of said second portion, there being a transverse shoulder between said main body portion and said second portion, and said body being disposed with said second portion extending through said opening in said upright member, said second portion being exteriorly threaded, a mounting nut engaging the threads on said second portion, said upright member being clamped between said nut and said shoulder, fixed valve means carried by said body and having an orifice communicating with said bore to conduct water therefrom, an operating lever, means mounting said lever on said main body portion for pivotal movement about a horizontal axis spaced from said upright member and extending generally parallel thereto, said lever having a portion extending generally toward said upright member, movable valve means operatively associated with said lever, pivotal movement of said lever in one direction about said axis actuating said movable valve means into engagement with said fixed valve means to terminate flow of water through said orifice, and a spring connected to said lever to bias the same pivotally in the opposite direction;

a suspension member connected to said portion of said lever adjacent said upright member; and other support means connected to said trough at a point spaced lengthwise of the trough from said upright member, the combined weight of said trough, said valve and the water in said trough tending to pivot said lever in said one direction against the biasing action of said spring.

7. In a weight operated valve for supplying liquid to a receptacle, the combination of a rigid valve body having opposite ends and an internal cavity opening through one of said ends, said one end of said body being adapted for connection to a supply conduit for supplying liquid to said cavity, said body having a first axis extending between said ends;

mounting means carried by said body adjacent said one end thereof for securing said body rigidly to a portion of the receptacle;

operating lever means;

pivot means supporting said lever means on said body for pivotal movement about at least a second axis extending transversely of said first axis and located nearer to the other end of said body than to said one end, said lever means including a rigid lever portion projecting generally beside said body toward said one end and terminating in a free end portion, said free end portion of said rigid lever portion being provided with means whereby a suspension device can be connected thereto to accomplish support of the combination of the receptacle and said valve via said lever means;

fixed valve means carried by said body and having an orifice for conducting liquid from said internal cavity;

movable valve means; and spring means connected between said lever means and said body to bias said lever means pivotally about said second axis in a direction opposing the force applied to said lever means by the combined weight of the receptacle, its contents and said valve when said valve is secured to the receptacle by said mounting means and a suspension device is connected to said free end portion of said lever means, said movable valve means being arranged to be actuated by said lever means into valve-closing engagement with said fixed valve means when said lever means is pivoted in the opposite direction.

8. A valve in accordance with claim 7 and wherein said second axis is spaced from said one end of said body by a distance greater than the distance between said ends, and said fixed valve means and said movable valve means are disposed between said second axis and said mounting means.

9. A valve in accordance with claim 7 and wherein said rigid lever portion has an at least generally U-shaped transverse cross section;

said body extends within the U of said rigid lever portion; and said movable valve means is mounted on the base of the U of said rigid lever portion.

10. A valve in accordance with claim 7 and wherein said lever means consists of an integral sheet metal structure of at least generally U-shaped transverse cross section and said valve body extends longitudinally between the legs of the U thereof, said integral sheet metal structure comprising two side flanges defining the legs of the U, two base portions extending between said side flanges and spaced apart longitudinally of the structure, and a projection extending generally longitudinally from one of said base portions, said movable valve means being carried by said projection.

11. In a weight operated valve for both supplying liquid to a receptacle and movably supporting the receptacle, the combination of a valve body structure having opposite ends and an internal cavity opening through one of said ends, said one end of said body structure being adapted for connection to a supply conduit for the supply of liquid to said cavity, said body structure having a first axis extending between said ends;

mounting means carried by said body structure adjacent said one end thereof for securing said body structure rigidly to a portion of the receptacle;

operating lever means;

means supporting said lever means on said body structure for pivotal movement about at least a second axis extending transversely of said first axis and located nearer to the other end of said body structure than to said one end, said lever means including a portion extending generally from the location of said other end of said body structure toward the location of said one end of said body structure to terminate in a free end portion spaced from said other end of said body structure along a line extending transversely of said second axis, said free end portion having means whereby suspension means can be attached thereto accomplish support of the combination of the receptacle and said valve via said lever means;

fixed valve means carried by said body structure and having an orifice for conducting liquid from said internal cavity;

movable valve means; and spring means connected between said lever means and a fixed point on said body structure to bias said lever means pivotally about said second axis in a direction opposing the force applied to said lever means by the combined weight of the receptacle, its contents and said valve when said valve is attached to the receptacle by said mounting means and a suspension means is connected to said free end portion of said lever means, said movable valve means being arranged to be actuated by said lever means into engagement with said fixed valve means when said lever means is pivoted in the opposite direction.

12. In a poultry waterer, the combination of an elongated trough having an end wall of sheet material and a sheet material portion affixed directly to said end wall, said sheet material portion being provided with an opening located above the bottom of the trough;

a weight-operated valve comprising a main body structure defining an internal cavity and having an exteriorly threaded portion of such size as to be received in said opening, said cavtiy opening through said exterior threaded portion, there being a transverse shoulder between said exteriorly threaded portion and the remainder of said body structure, a mounting nut engaging the threads of said exteriorly threaded portion, said exteriorly threaded portion extending through said opening in said sheet material portion and said sheet material portion being clamped between said nut and said shoulder to secure said body structure to said trough, fixed valve means carried by said body structure and having an orifice communicating with said cavity and via which water can flow for discharge into said trough, operating lever means, means mounting said lever means on said body structure for pivotal movement about at least one horizontal axis, said lever means including a rigid lever portion extending toward said end wall of said trough and having a free end portion disposed in proximity to said end wall, movable valve means operatively associated with said lever means, pivotal movement of said lever means in one direction about said horizontal axis actuating said movable valve means into valve-closing engagement with said fixed valve means, and spring means connected to said lever means to bias the same pivotally in the opposite direction;

a suspension member connected to said free end portion of said rigid lever portion adjacent said end wall; and other support means connected to said trough at a point spaced lengthwise of the trough from said end wall, the combined weight of said trough, said valve and the water in the trough tending to pivot said lever in said one direction against the biasing action of said spring means.

References Cited in the file of this patent

UNITED STATES PATENTS 2,724,402    Kofford _____ Nov. 22, 1955